(12) United States Patent
Pribble

(10) Patent No.: US 11,278,939 B2
(45) Date of Patent: Mar. 22, 2022

(54) MEDIA RECOVERY TECHNOLOGY

(71) Applicant: Iron Mountain Incorporated, Boston, MA (US)

(72) Inventor: Kelly Pribble, Dover, NJ (US)

(*) Notice: Subject to any disclaimer, the term of this patent is extended or adjusted under 35 U.S.C. 154(b) by 146 days.

(21) Appl. No.: 15/635,274

(22) Filed: Jun. 28, 2017

(65) Prior Publication Data
US 2018/0005664 A1    Jan. 4, 2018

Related U.S. Application Data

(60) Provisional application No. 62/356,347, filed on Jun. 29, 2016.

(51) Int. Cl.
| | | |
|---|---|---|
| *B08B 1/02* | (2006.01) | |
| *B08B 3/04* | (2006.01) | |
| *B08B 3/08* | (2006.01) | |
| *B08B 3/12* | (2006.01) | |
| *B08B 7/00* | (2006.01) | |
| *G03C 11/06* | (2006.01) | |

(52) U.S. Cl.
CPC ............... *B08B 1/02* (2013.01); *B08B 3/041* (2013.01); *B08B 3/08* (2013.01); *B08B 3/123* (2013.01); *B08B 7/0071* (2013.01); *G03C 11/06* (2013.01)

(58) Field of Classification Search
None
See application file for complete search history.

(56) References Cited

U.S. PATENT DOCUMENTS 5,311,371 A * 5/1994 Clark ................... G11B 23/502
                                                      360/137

* cited by examiner

*Primary Examiner* — Mikhail Kornakov
*Assistant Examiner* — Ryan L Coleman

(57) ABSTRACT

A method of remediating a media asset comprising a magnetic tape includes preliminarily cleaning the media asset, treating the media asset, and finally cleaning the media asset. Treating the media asset includes baking the media asset, determining whether adjacent layers of the tape are stuck to each other, and re-baking the media asset. If adjacent layers of the tape are stuck to each other, the method includes submerging the magnetic tape in a cleaning bath for a predetermined period of time, unwinding the magnetic tape from a supply reel to a take-up reel at an unwind speed while drying the magnetic tape, and rewinding the magnetic tape onto the supply reel at a rewind speed before re-baking the media asset.

16 Claims, 10 Drawing Sheets

MEDIA RECOVERY TECHNOLOGY

CROSS-REFERENCE TO RELATED APPLICATIONS

This application claims the benefit of U.S. Provisional Application No. 62/356,347, filed Jun. 29, 2016 and entitled MEDIA RECOVERY TECHNOLOGY, the entire contents of which are hereby incorporated by reference in their entirety.

FIELD OF THE INVENTION

This application relates to media recovery technology, and more particularly to media recovery technology for assets in various states of degradation.

BACKGROUND

The preservation of recordable media is an important consideration for the art and entertainment industry to ensure that various forms of art (films, music, etc.) throughout history are preserved and thus available for future generations to appreciate and enjoy. However, the aging of recorded media, the improper storage conditions of recorded media, and the rapid introduction of new formats of recordable media are some factors that make preservation difficult. As a result, recordable media may be in various conditions of degradation that include mold, water damage, salt residue, Sticky Shed Syndrome (hydrolysis), adhesion not associated with hydrolysis, glue seep, splice repair, lubricant loss, static discharge, and acetate spoking, among others. Furthermore, some formats of recorded media may be more difficult to preserve compared to others due to the technology used. As one example, the Digital Tape Recording System ("DTRS"), Alesis Digital Audio Tape ("ADAT"), and Digital Audio Tape ("DAT") formats of recordable media can be difficult to preserve. These formats were not developed or manufactured for the professional recording industry and thus the quality of the recording media was at best subpar, occasionally resulting in a tape simply not even loading into the playback machine.

In view of these aforementioned problems, there is a need for media recovery technology to remediate and preserve media in various states of degradation.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

In one aspect, systems and methods are provided for media remediation and recovery of magnetic tapes and other media assets in various conditions of degradation. In some cases, the method may restore tapes that would otherwise be beyond any recovery. A non-limiting method of remediating a media asset comprising a magnetic tape includes preliminarily cleaning the media asset, treating the media asset, and finally cleaning the media asset. Treating the media asset includes baking the media asset, determining whether adjacent layers of the tape are stuck to each other, and re-baking the media asset. If adjacent layers of the tape are stuck to each other, the method includes submerging the magnetic tape in a cleaning bath for a predetermined period of time, unwinding the magnetic tape from a supply reel to a take-up reel at an unwind speed while drying the magnetic tape, and rewinding the magnetic tape onto the supply reel at a rewind speed before re-baking the media asset.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
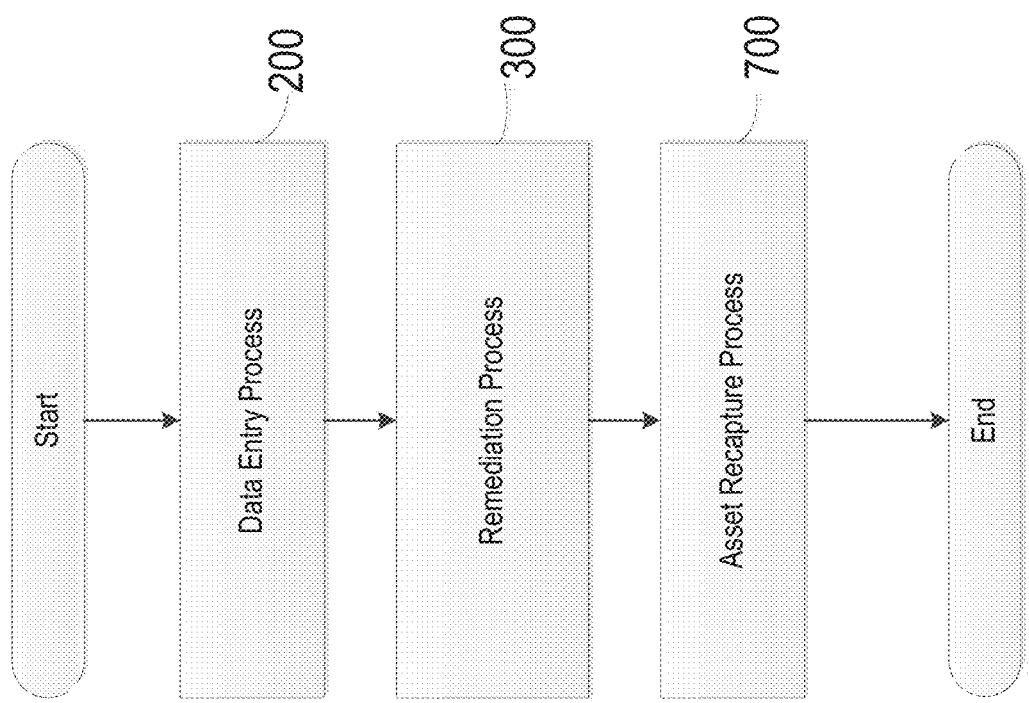
FIG. 1 is a flow chart of a method for the recovery of media technology according to aspects of the current disclosure.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "left," "right," "front," "back," and "corners," among others are intended to refer to the orientation as illustrated and described in the figure (or figures) to which the components and directions are referencing.

In one aspect, disclosed are systems and methods for the remediation and recovery of recordable media such as magnetic tapes and other media assets in various conditions of degradation. For reasons such as age, storage conditions (e.g., in a wet or damp environment, in a high-salt environment, etc.), and/or format, media assets may be in various conditions of degradation that include mold, water damage, salt residue, Sticky Shed Syndrome (hydrolysis), adhesion not associated with hydrolysis, glue seep, splice repair, lubricant loss, static discharge, and acetate spoking, among others. For example, a very well-known issue with magnetic tapes is called "Sticky Shed Syndrome" where the tape absorbs moisture from its surroundings and produces a sticky residue on the tape that causes adjacent layers of the tape on the reel to adhere or "stick" to each other. This residue prevents the tape from playing properly. Baking or dehydrating the tape at a specified temperature and length of time will temporarily remedy this issue for play of tape, but is not necessarily a permanent solution. For example, a "Sticky Shed" baking remediation method may be insufficient to prevent oxide binding/separation and irretrievable asset damage.

In one aspect, systems and methods are provided for media remediation and recovery of magnetic tapes and other media assets. For example, in some cases, the method may be used for remediation and recovery of media assets following long-term storage of the media assets in a wet environment or a high-salt environment. The method may also be used for the remediation and recovery of media assets in various conditions of degradation that include mold, water damage, salt residue, Sticky Shed Syndrome (hydrolysis), adhesion not associated with hydrolysis, glue seep, splice repair, lubricant loss, static discharge, and acetate spoking, among others. In various examples, the method includes a data entry phase and a remediation phase. In the data entry phase, the media asset is analyzed and prepared for the remediation phase. In the remediation phase, the method includes performing an initial cleaning process on the media asset, performing an adhesion removal process on the asset, and performing a final cleaning process on the media asset.

In some cases, the method includes careful reintroduction of the tape to the type of environment that caused the binding and carefully controlled unwinding. In some cases, the method may restore tapes that would otherwise be beyond any recovery. As mentioned above, as part of the process, the tape is mounted on a cleaning machine. In some cases, the cleaning machines are modified recorders without the playback/record head stacks, capstan motor and other mechanical parts. The cleaning machines are adjusted for the various steps at different speed levels to reduce the possibility of further damage to the media. As mentioned above, as part of the process, in some cases, the tape is wound on the cleaning machine and hand cleaned on both sides, using a cleaning device that includes pellon fiber cloth. After a first cleaning pass is complete, the now-empty original tape reel is wiped down with diluted cleaning agent, and allowed to dry completely. If the original reel is suitable, the tape is then wound back onto its original reel, and once again cleaned on both sides using a pellon fiber cloth. If the original box or storage container is suitable, the tape can then be returned to its original box awaiting capture. In some cases, where the original box or storage container is contaminated, the tape can be sealed in a poly-bag. In other cases, a new, uncontaminated box can be utilized.

In other cases, a remediation process can include hand cleaning a physical asset with a media recovery cleaning device, baking or dehydrating the physical asset, machine cleaning the physical asset, and metadata preservation of the media content of the physical asset. In some cases, machine cleaning of the physical asset includes unbinding the adhesion prior to unwinding to prevent permanent damage from occurring. In further examples, a remediation process can include providing a controlled containment environment and constantly scrubbing air for the purpose of cleaning and remediating infected assets. In some aspects, hand cleaning of the assets can include a cleaning machine. In some cases, the cleaning machine can be a converted a 2" studio tape machine to aid in the hand cleaning of these assets. In various cases, the method can also include unwinding the assets through an unwinding machine. In certain cases, the unwinding machine may be modified from equipment used in the motion picture industry. In some cases, using the unwinding machine with adhesive removal solutions may unbind the asset for preservation.

Figure 2:
FIG. 2 is a flow chart of a data entry process of the method of FIG. 1.

Referring to FIG. 1, in various examples, a media recovery method 100 includes a data entry process 200, a remediation process 300, and an asset recapture process 700. Exemplary steps of the data entry process 200 are illustrated in FIG. 2 and exemplary steps of the remediation process 300 are illustrated in FIGS. 3-6. The media asset recovered generally through the method 100 may include various types of media assets including, but not limited to analog audio tapes (e.g., ¼ in., ½ in., 1 in., 2 in., etc.), digital audio tapes (e.g., ½ in., 1 in., etc.), analog Video Home System (VHS) tapes, U-matic video tapes, and various other types of magnetic tapes. Media assets generally include a magnetic tape wound on a reel, which optionally includes one or more reel flanges. FIG. 7 illustrates a non-limiting example of a media asset 701 that includes a reel 702, magnetic tape 704 wound on the reel 702, and flanges 706A-B.

During the data entry process 200, and as illustrated in FIG. 2, a media asset is initially received in a step 202. In a step 204, a unique identification label, such as a new asset label, is created and attached to the media asset such that the label does not interfere with playing the asset. Depending on the type of media asset, the label may be attached at various locations. For example, if the media asset is an audio reel that includes flanges, the label may be attached on one side of the flanges, such as a side that does not interfere with playing the asset. As another example, if the media asset is a video tape (VHS, U-matic, etc.) that includes a cartridge housing, the label is attached to the media asset such that the door or gate of the cartridge housing is not obstructed from opening inside the media player. The door or gate of the cartridge housing opens within the media player to access the actual tape, and further serves to protect the tape when the video tape is not being used.

In a step 206 of the data entry process 200, the media asset is optically scanned with an optical scanning device, and the images generated by the optical scan are electronically imported into a database file. In various examples, the media asset's container (e.g., box, case, etc.) as well as internal metadata are optically scanned and imported. The optical scanning device may be various devices suitable for generating and image of the media asset, the media asset container, and/or internal metadata, including, but not limited to, various cameras, image scanners, or various other types of devices that device that optically scan an object and convert it to a digital image. In various examples, optically scanning the media asset creates a record to which the media asset may be compared during remediation or asset recapture.

In a step 208 of the data entry process 200, the media asset is removed from the asset container for further processing during the remediation process 300 and asset recapture process 400, as described below. Once the media asset is removed, the media asset container may be sealed within a container suitable for containing or quarantining any contamination of the media asset container. In some examples, the container for sealing the media asset container forms an air-tight seal. As one non-limiting example, the container may be a poly-bag, although in other embodiments, various other suitable containers may be used. The sealed media asset container is then packaged for subsequent storage, recovery, and/or disposal.

Figure 3:
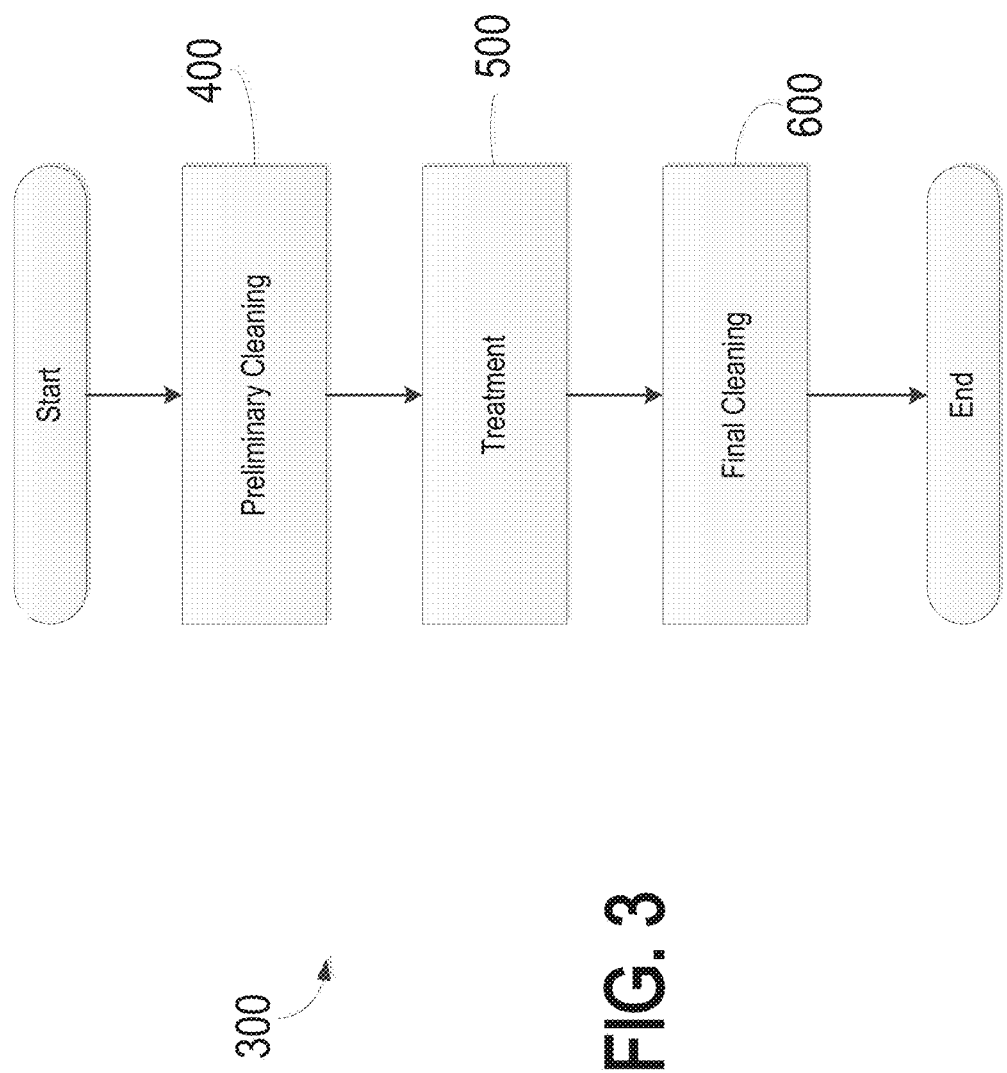
FIG. 3 is a flow chart of a remediating process of the method of FIG. 1.
Figure 4:
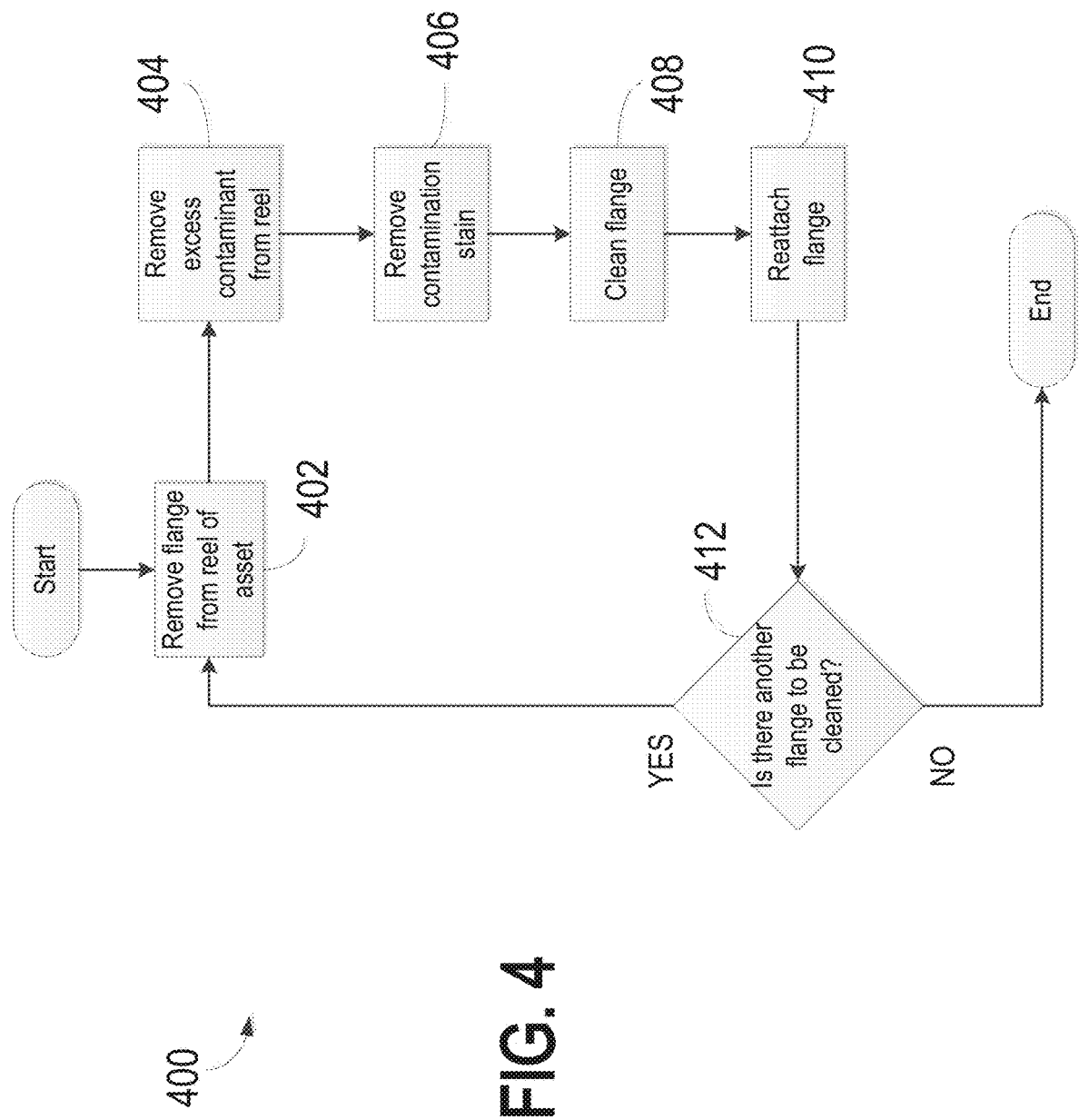
FIG. 4 is a flow chart of a preliminary cleaning process of the remediating process of FIG. 3.
Figure 5:
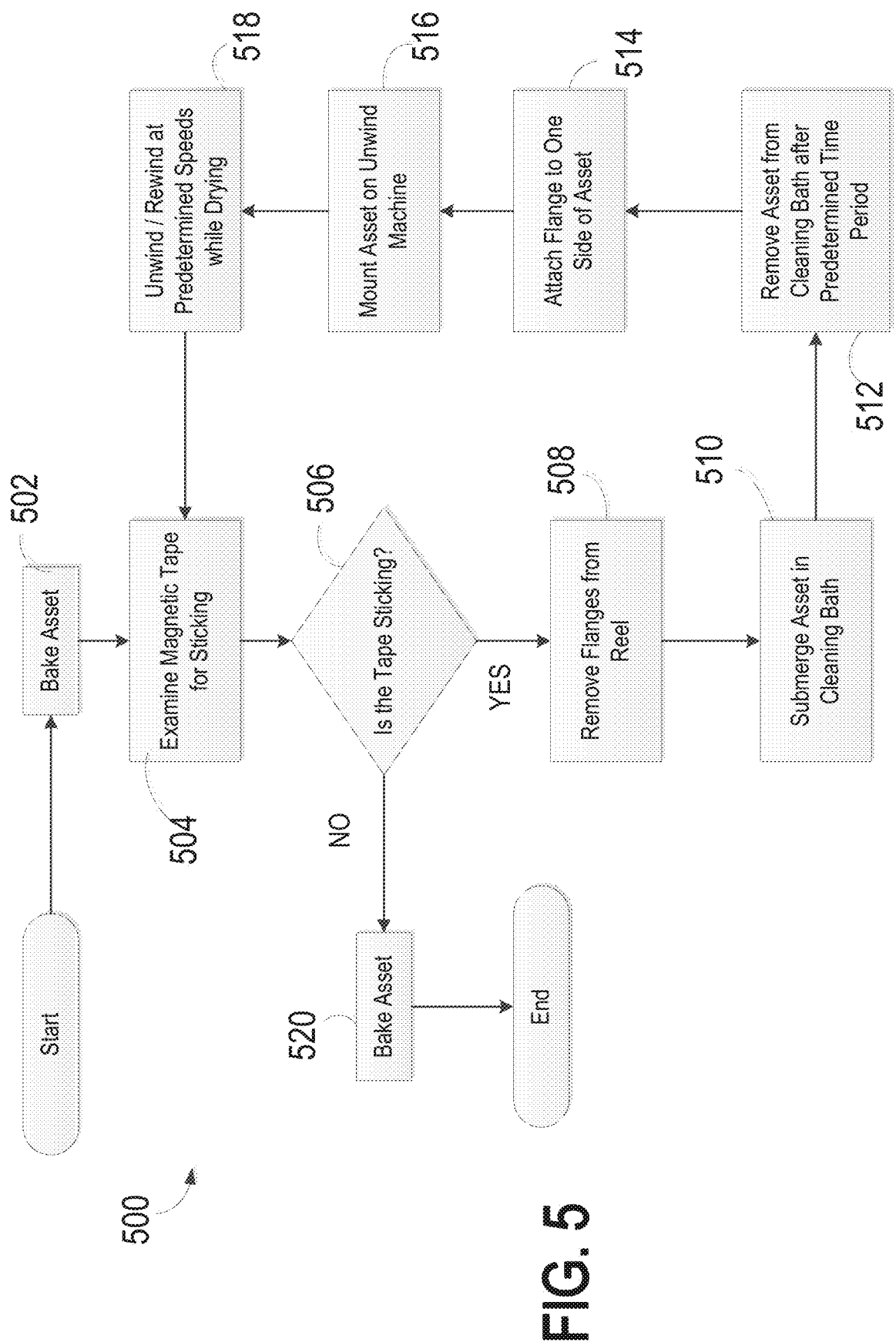
FIG. 5 is a flow chart of a treatment process of the remediating process of FIG. 3.
Figure 6:
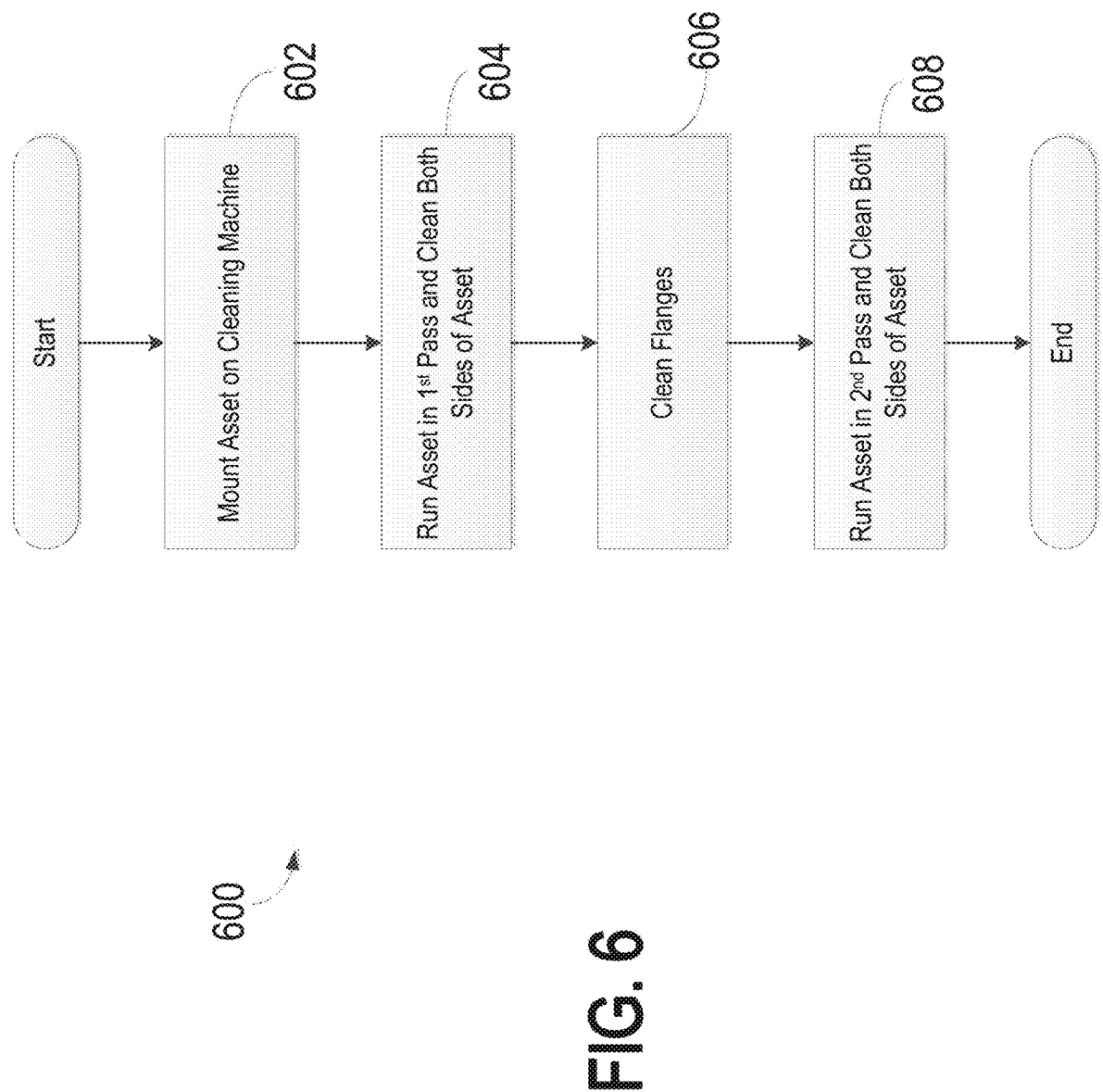
FIG. 6 is a flow chart of a final cleaning process of the remediating process of FIG. 3.
Figure 7:
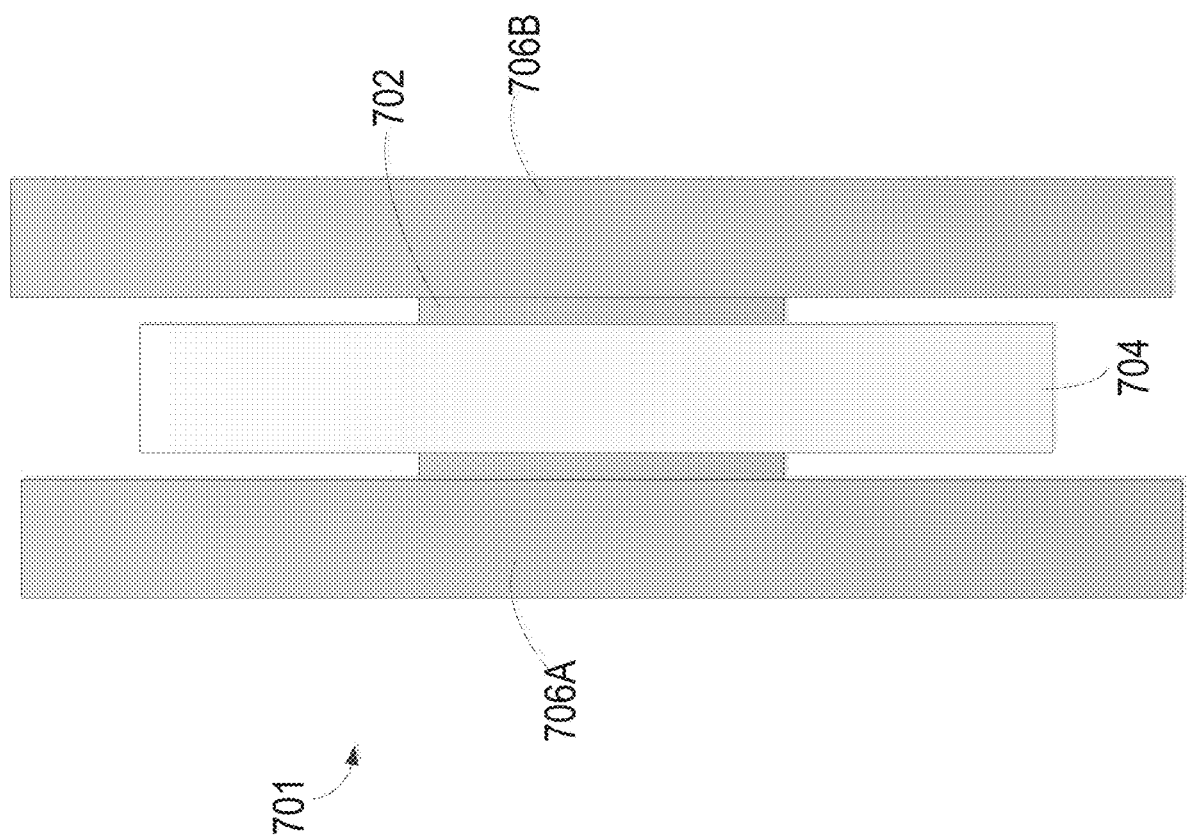
FIG. 7 is a side view of an example of a media asset that may be treated with the method of FIG. 1.

As illustrated in FIG. 3, the remediation process 300 generally includes a preliminary cleaning process 400 (see FIG. 4), a treatment process 500 (see FIG. 5), and a final cleaning process 600 (see FIG. 6).

Referring to the preliminary cleaning process 400, in a step 402, the media asset is received from the data entry process 200, and a flange (e.g., a metal flange) from one side of the original reel of the media asset is removed. In various examples, the flange is removed from the reel through a drill, screw gun, screwdriver, or various other devices suitable for removing the flange from the reel Optionally, in some cases, the media asset may not have a flange on either side of the reel (e.g., a tape "pancake"). In such cases, the step 402 may be omitted.

In a step 404, excess contamination (salt residue, mold, etc.) that is easily removable (such as loose particles or other easily removable forms of contamination) is removed from the side of the reel to capture and/or filter the contamination as much as possible and minimize the reintroduction of the contamination into the room. In this step, excess contamination generally refers to particles that are built up on the tape but that are easily removed, such as through a vacuuming procedure, brushing procedure, or other suitable procedure. The side of the reel in step 404 is the side from which the flange was removed in step 402. In various examples, removing excess contamination from the side of the reel includes sweeping loose contamination from the reel with a brushing device and removing the loose contamination. The brushing device may be various suitable brushes, rags, etc. As one non-limiting example, the brushing device is a 1 in. brush. In some examples, removing the loose contamination may include vacuuming the loose contamination with a vacuuming device. As one non-limiting example, the vacuuming device may be a HEPA vacuum, although various other types of vacuuming devices may be used.

During the preliminary cleaning process 400, in a step 406, the contamination stain is removed, Compared to the excess contamination removed in step 404, a contamination stain refers to a visible stain that is left on the tape and is still visible after the loose excess contamination has been removed and generally cannot be vacuumed away or removed in step 404. Removing the contamination stain includes wiping the exposed side edges of the tape with a tape-cleaning solution. Optionally, a predetermined length of the tape may also be wiped with the cleaning solution to remove the contamination stain.

In some examples, a cloth (e.g., multi-purpose shop towels) or other similar material may be used to apply the tape-cleaning solution to the tape. The tape-cleaning solution may be various suitable solutions that treat contamination and/or remove the contamination stain without destroying the tape. In one non-limiting example, the tape-cleaning solution is a hydrogen peroxide solution, such as a 3% hydrogen peroxide solution, which was found through testing to be well-suited for removing the contamination stain such as salt residue or mold, killing mold spores, and maintaining the integrity of the tape. In contrast, diluted bleach may kill mold but may also destroy the tape. In various examples, the tape-cleaning solution is applied until the contamination stain is completely removed or minimally remains to minimally interfere with usage of the media asset.

In a step 408, the flange is cleaned to remove contamination stain, salt residue, dirt, etc. In some examples, cleaning the flange includes applying a flange-cleaning solution to the flange. In various examples, the flange-cleaning solution is a solution that treats contamination without destroying the surface of the material. As one non-limiting example, the flange-cleaning solution may be a 5/1 bleach solution, although various other solutions may be used. In various examples, the flange-cleaning solution is applied until the contamination stain is completely removed or minimally remains to minimally interfere with usage of the media asset. In some examples, cleaning the flange includes drying the flange for a predetermined amount of time. In other examples, cleaning the flange includes applying another flange-cleaning technique, such as applying ultraviolet light to the flange.

After the flange is cleaned, it is reattached to the original reel in a step 410. In a step 412, if the reel has another flange to be cleaned, the process returns to step 402. For example, if the reel has two flanges, from step 412, the process returns to step 402 to remove the second flange. If there are no other flanges to be cleaned, the process ends.

After the preliminary cleaning process, the media asset is processed through the treatment process 500, which is illustrated in FIG. 5. In a step 502, the media asset is baked/dehydrated to a predetermined temperature for a predetermined time period to prevent damage from "Sticky Shed Syndrome." In step 502, the media asset is baked in a convection oven, electric oven, dehydrator, or other similar baking device. In various examples, the media asset is baked at low temperatures for relatively long period of times. For example, in some cases, the media asset is baked at temperatures of from about 80° F. to about 200° F., such as from about 100° F. to about 180° F., such as from about 120° F. to about 160° F., such as from about 130° F. to about 140° F. In various examples, the media asset is baked for about 1-10 hours, such as from about 2-4 hours, such as from about 4-6 hours, such as from about 6-8 hours, such as from about 8-10 hours. In other examples, other temperatures suitable for baking the media asset may be used. In various cases, the duration of baking depends on a width of the tape. As one non-limiting example, a ¼ inch ("in.") tape may be baked for about 2-4 hours, a ½ in. tape may be baked for about 4-6 hours, a 1 in. tape may be baked for about 6-8 hours, and a 2 in. tape may be baked for about 8-10 hours.

In a step 504, the media asset is examined for sticking and in a step 506, the process determines whether adjacent layers of the tape are stuck together. In some examples, determining whether adjacent layers of the tape are stuck together includes visually inspecting the tape for missing oxide and/or the auditory inspection the tape. For example, visually inspecting the tape may include examining the tape as it rewinds/unwinds to determine whether adjacent layers of the tape are stuck together. Similarly, auditory inspecting the tape may include listening for ripping or tearing of the tape due to adjacent layers being stuck together.

If it is determined in step 506 that layers of the tape are stuck together, the treatment process 500 proceeds to an adhesion remediation sub-process starting with step 508, where the flanges (if present) are removed from both sides of the reel. In a step 510, the tape is submerged in an adhesion-removal cleaning bath for a predetermined amount of time. The adhesion-removal cleaning bath may be various solutions or mixtures suitable for removing adhesion without damaging the tape. As one non-limiting example, the adhesion-removal cleaning bath includes distilled water at room temperature, although other solutions or temperatures may be used. In various examples, the temperature of the solution depends on the type of media asset. In a step 512, the media asset is removed from the cleaning bath after a predetermined amount of time. In certain examples, the predetermined amount of time is at least 48 hours. In some examples, the predetermined amount of time is from about 48 hours to about 2 weeks. The predetermined amount of time may depend on the type of media asset as well as the extent of contamination on the tape.

In some examples, in addition to or in place of steps 510 and 512, the method may include inserting the tape into an ultrasonic machine filled with distilled water or other suitable solutions. In such examples, stands or spacing devices, such as plastic rings, metal baskets, etc., may be used to position the tape within the ultrasonic machine such that the bottom of the tape is spaced apart from the bottom of the ultrasonic machine while the tape is in the ultrasonic machine. Other similar devices may be placed on the bottom of the ultrasonic machine to space the bottom of the tape away from the bottom of the machine while in the ultrasonic machine. In some examples, spacing or lifting the tape off of the bottom of the ultrasonic machine allows the distilled water to amply penetrate and/or clean the tape.

While the tape is submerged in the bath in the ultrasonic machine, the ultrasonic machine is turned on for a predetermined period of time. In some examples, the predetermined period of time in the ultrasonic bath is significantly less than the predetermined amount of time in step 510. For example, in some cases, the predetermined period of time in the ultrasonic machine is less than about two hours, such as less than about one hour, such as less than about 30 minutes, such as less than about 20 minutes, such as less than about ten minutes. In one non-limiting example, the predetermined period of time is about 5-10 minutes, such as about 7 minutes. After the predetermined time period in the ultrasonic bath, the tape is optionally flipped over and re-submerged such that the opposite side edge of the tape is proximate to the bottom of the ultrasonic machine, and the ultrasonic machine is turned on again for another predetermined time period in the ultrasonic bath. The process of submerging the tape, running the ultrasonic machine, flipping and re-submerging the tape, and running the ultrasonic machine may be repeated as many times as needed or desired. As one non-limiting example, in some cases, the ultrasonic machine is run twice with the first side edge of the tape near the bottom of the ultrasonic machine and twice with the second side edge of the tape near the bottom of the machine (four times total).

It was surprisingly found that the combination of the ultrasonic machine and the solution significantly reduces the amount of time needed to treat the tape. The combination of submerging the tape within the ultrasonic bath and running the ultrasonic machine for the predetermined time period causes the solution to penetrate between the layers of the tape and dissolve adhesion with the same efficacy as submerging the tape in the bath (e.g., in step 510) for a two week period.

Figure 8:
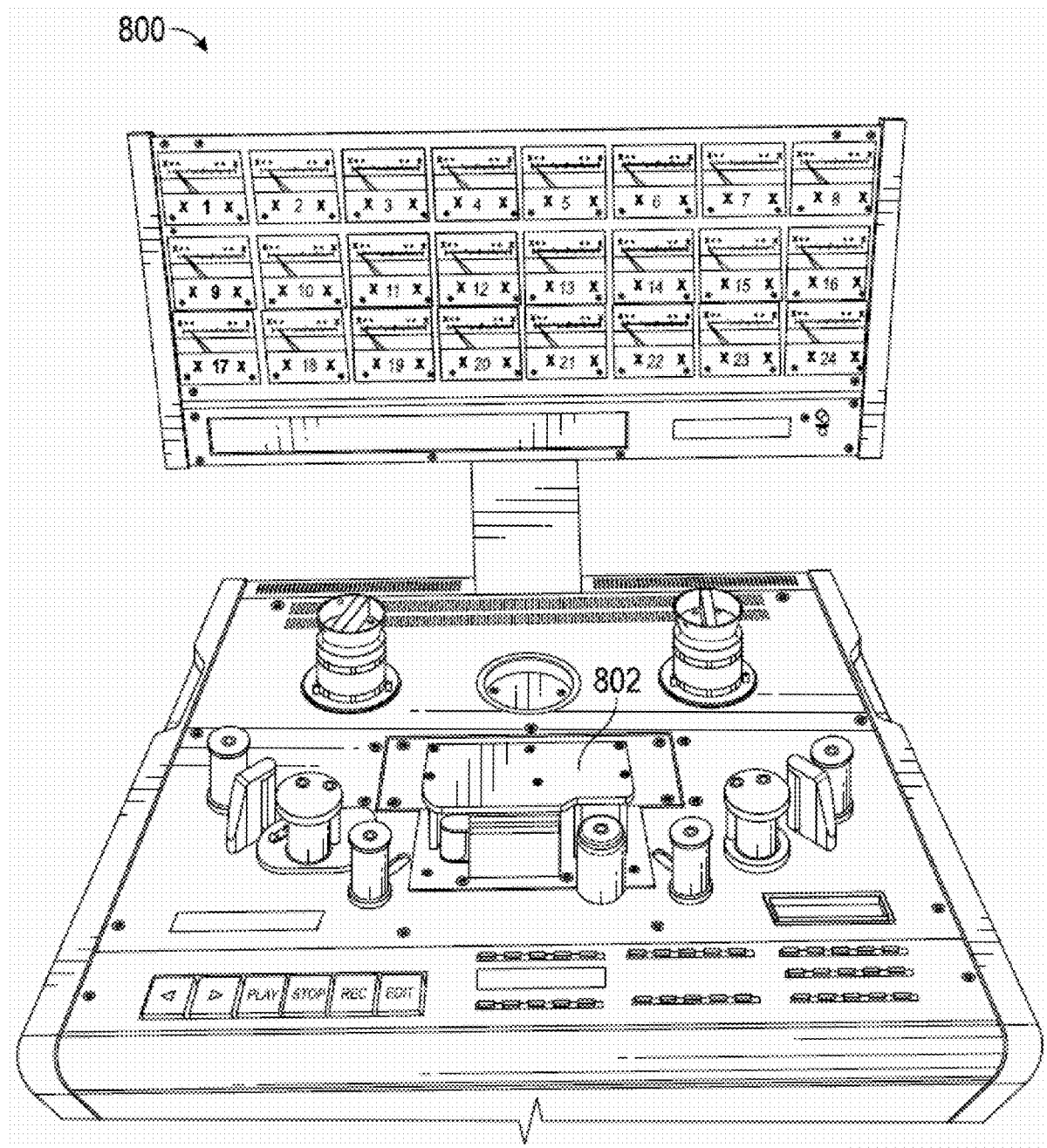
FIG. 8 illustrates an example of an unwind machine with tape head assembly mounted according to aspects of the present disclosure.
Figure 9:
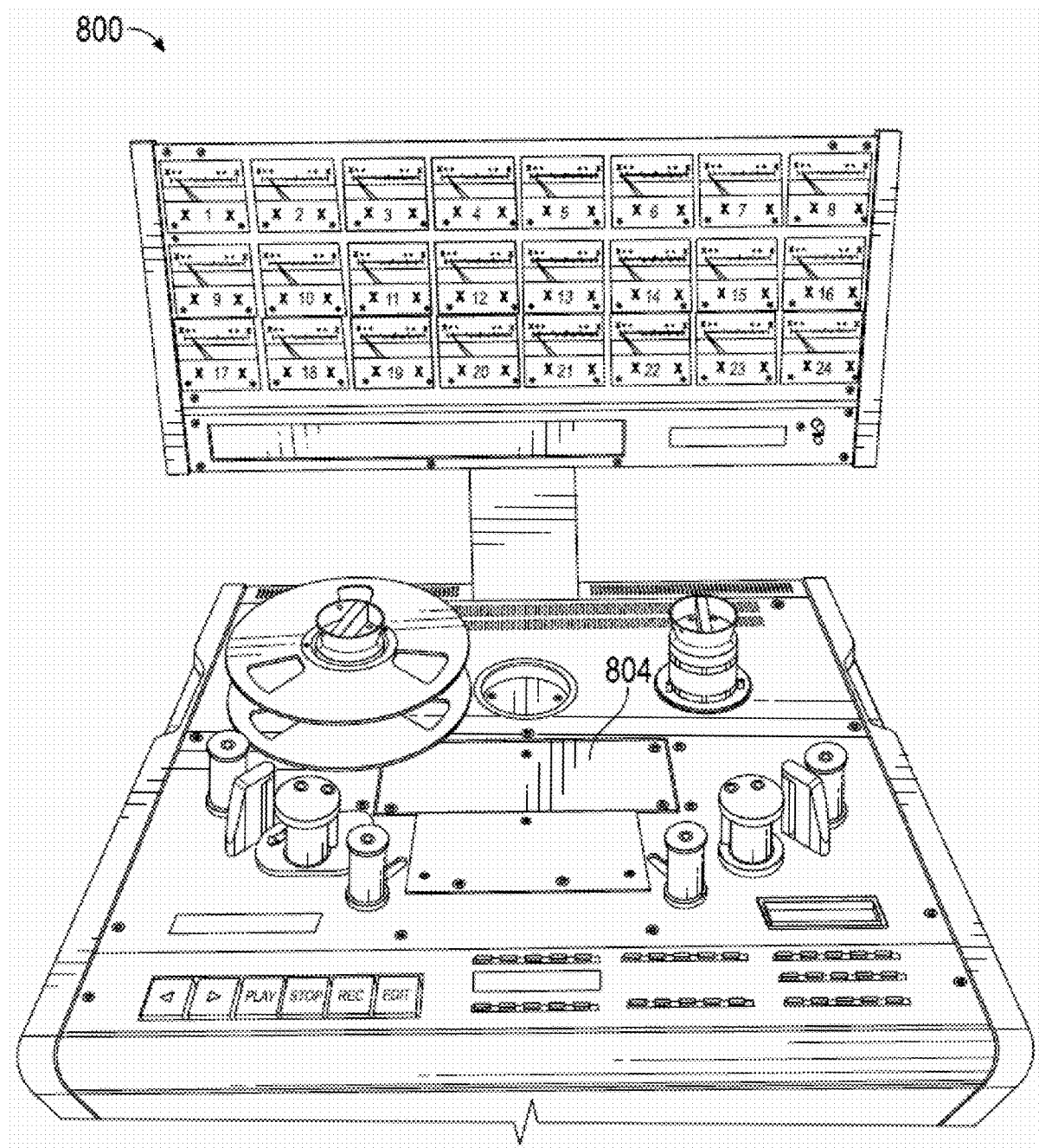
FIG. 9 illustrates the unwind machine of FIG. 8 with the tape head assembly removed and a protective plate installed to prevent dirt and other particles or contaminations from falling into the machine.

In a step 514 and after the tape is removed from the adhesion-removal cleaning bath, the flange is attached to one side of the tape. In various examples, mounting the flange to only one side of the tape may allow for visual inspection of the tape to see if the tape still has adhesion during unwinding of the tape (described below). In a step 516, the tape is mounted on an unwind machine. The unwind machine may be various machines suitable for unwinding the tape at controllable winding/unwinding speeds. As one non-limiting example, the unwind machine may be a Studer A827 recorder or Studer A820 recorder. In some examples, the unwind machine is modified such that the tape head assembly is removed and replaced with a metal plate to prevent dirt and other particles or contaminations from falling into the electronics of the machine. For example, FIG. 8 illustrates an example of an unwind machine 800 with the tape head assembly 802, and FIG. 9 illustrates an example of the unwind machine 800 with a protective plate 800 to prevent dirt and other particles or contaminations from falling into the machine 800.

In a step 518, the unwind machine unwinds/rewinds the tape at an unwind speed while the asset is dried with a drying device. Step 518 can include unwinding the tape from the original reel and rewinding the tape onto a take-up reel, all the while drying the tape as it moves from the supply reel to the take-up reel. Step 518 may be repeated as many times as needed.

In various examples, the unwind speed is from about 0.1 meters per second (mps) to about 4.0 mps, such as from about 0.2 mps to about 2.0 mps. In some examples, the unwind speed is 0.2 mps. At these unwind speeds (which is less than typical factory-set library wind speeds), the unwinding of the tape is slow and controlled such that any rips or tears from adhesion may be detected. These unwind speeds also provide a sufficient amount of time to dry the asset with a drying device. In various examples, the drying device is configured to dry the media asset at temperatures that are high enough to dry the media asset without overheating or melting the tape. In various examples, in step 518, the tape is rewound at a rewind speed of from about 0.1 mps to about 4.0 mps, such as from about 0.2 mps to about 2.0 mps. In one non-limiting example, the rewind speed is 2.0 mps. In some examples, the rewind speed is different than the unwind speed, although it need not be. In various examples, rewinding the tape further comprises drying the tape with the drying device.

In some examples, between steps 516 and 518, an intermediary step includes pre-drying a predetermined length of the tape needed to thread the tape through the unwind machine adjacent to an end portion of the tape. By pre-drying the end portion of the tape, the end portion does not remain wet when wound on the take-up reel, which can lead to future sticking of the tape. During the unwinding/rewinding in step 518, the drying device (e.g., air mover, dryer, etc.), is positioned a predetermined distance from the tape for drying as the tape is unwound/rewound. In some examples, the predetermined distance for drying is from about 12 inches to about 18 inches, although various other distances may be used. From step 518, the treatment process 500 returns to step 504.

If it is determined in step 504 that the tape continues to stick together, the above-described process is repeated. If the tape is not sticking together in step 506, the treatment process 500 continues to step 520, where the asset is baked. Baking of the asset in step 520 is similar to the baking of the asset in step 502. After the treatment process 500, the method 100 includes the final cleaning process 600.

Referring to FIG. 6, in a step 602 of the final cleaning process, the asset is mounted on a cleaning machine. In some examples, the cleaning machine may be the unwind machine from the treatment process 500. In other examples, the cleaning machine may be various suitable magnetic tape-cleaning machines, such as Model 632 sold by Bow Industries, Inc.

In a step 604, the asset is cleaned with the cleaning machine while the asset is unwound (a "first pass" of cleaning). Alternatively, in some examples where the asset in mounted on the unwind machine, in step 604 the asset is cleaned with a novel cleaning device while the unwind machine unwinds the tape at a speed of from about 0.1 mps to about 4.0 mps, such as 2.0 mps.

Figure 10:
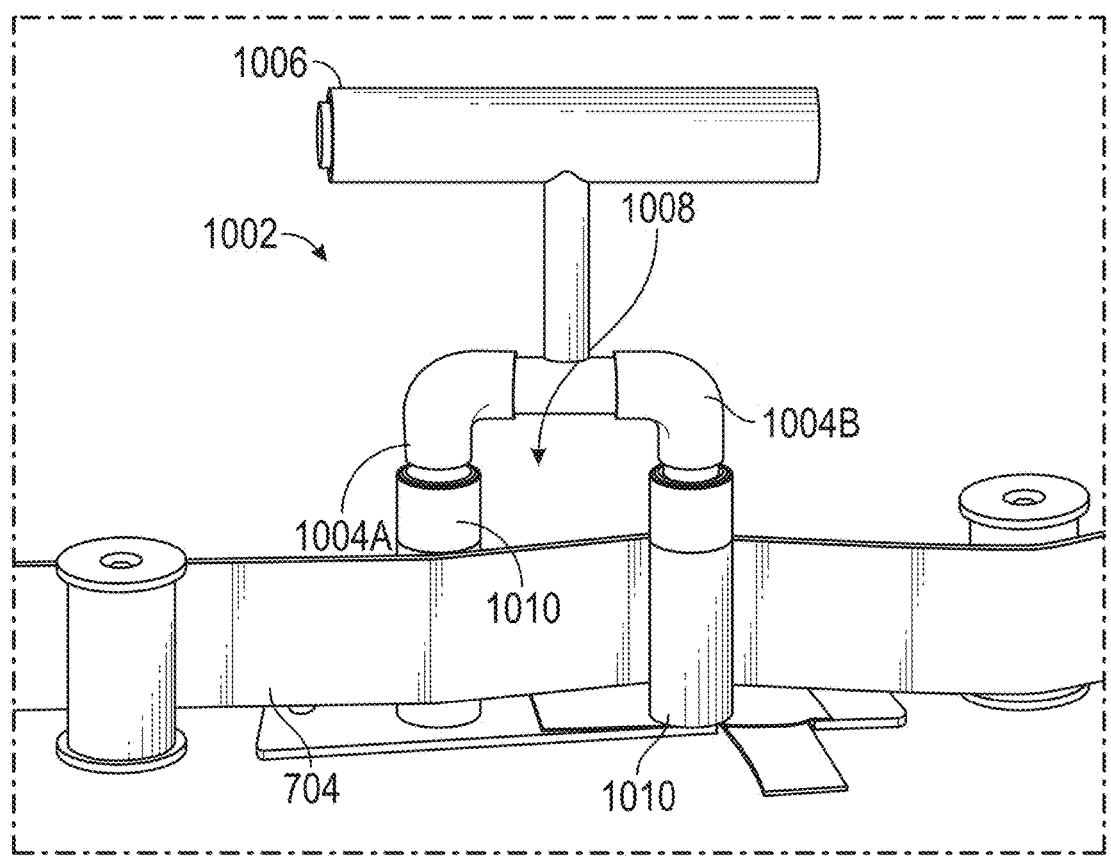
FIG. 10 illustrates an example of a cleaning device cleaning the media asset during the final cleaning process of FIG. 6.

An example of a novel cleaning device 1000 is illustrated in FIG. 10 and described below. The cleaning device 1000 includes a body 1002 having cleaning arms 1004A-B and a handle 1006. The cleaning arms 1004A-B are spaced apart to form a receiving area 1008 that the magnetic tape 704 passes through during cleaning, such as during steps 604 and/or 608. Each cleaning arm 1004A-B includes a cleaner 1010 positioned on the respective arm 1004A-B and configured to engage the magnetic tape 704 as it passes through the receiving area 1008. The cleaners 1010 may be various suitable devices including, but not limited to various cloths, fabrics, filters brushes, squeegees, towels, and other suitable cleaning devices. In some examples, the cleaners 1010 are rotatably positioned on the respective arms 1004A-B such that the cleaners 1010 rotate and engage the magnetic tape 704 as it passes through the receiving area 1008. In other examples, the cleaners 1010 may not rotate relative to the body 1002 and/or the magnetic tape 704 as it passes through the receiving area 1008.

In some examples, the cleaning arm 1004A is provided to clean a first side of the magnetic tape 704 and the cleaning arm 1004B is provided to clean a second side of the magnetic tape 704. Although two cleaning arms 1004A are illustrated, it will be appreciated that any number of cleaning arms 1004A may be provided. As one non-limiting example, in some cases, the cleaning device 1000 may include three, four, five, or any number of cleaning arms 1004 such that one, two, three, or any number of cleaning arms are provided for each side of the magnetic tape 704. In some examples, the number of cleaning arms 1004 for each side of the magnetic tape 704 may be the same or may be different (e.g., two cleaning arms for the first side of the magnetic tape 704 and three cleaning arms for the second side of the magnetic tape 704).

In some examples, the cleaning device 1000 may be adjusted to increase or decrease the amount of contact between the cleaners 1010 and the magnetic tape 704 as it passes through the receiving area 1008. For example, to decrease the amount of contact between the cleaners 1010 and the magnetic tape 704, after initially positioning the magnetic tape 704 within the receiving area 1008, the handle 1006 is moved (e.g., rotated) such that the cleaners 1010 cause reduced bending or curvature in the magnetic tape 704 along the travel path of the magnetic tape 704. Conversely, to increase the amount of contact between the cleaners 1010 and the magnetic tape 704, the handle 1006 is moved such that the cleaners 101 cause increased bending or curvature in the magnetic tape 704 along the travel path of the magnetic tape 704. In other words, the travel path of the magnetic tape 704 with increased contact is more S-shaped than the travel path with decreased contact.

In a step 606, the flanges of the asset are cleaned with the flange-cleaning solution, such as, but not limited to, the solution from step 408. Compared to step 408, the flanges in step 606 are not removed from the original reel such that the original reel (devoid of the tape at this point) gets an extra cleaning with the flange-cleaning solution before rewinding the tape back to the original reel. In a step 608, the asset is run in a second pass with the cleaning machine or cleaning device 1000. Step 608 is similar to step 604 except that the tape in step 608 is wound in the opposite direction from step 604, back onto the original reel. Although only two cleaning passes are illustrated (steps 604 and 608), any desired number of cleaning passes may be performed as desired or needed.

Referring back to FIG. 1, the asset recapture process 700 includes storing the asset in a media asset container. In some examples, the media asset container is the original, contaminated media asset container from step 208, which optionally has been cleaned. In such examples, the asset is sealed in a container (e.g., poly-bag or other sealable container) before it is returned to the original media asset container. In other examples, the media asset container is a new, un-contaminated media asset container.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A method of remediating residue on a media asset comprising a tape provided on a supply reel such that the layers of the tape are adjacent and in contact with each other, the method comprising:
   preliminarily cleaning the media asset;
   treating the media asset; and
   finally cleaning the media asset,
   wherein finally cleaning the media asset comprises:
   mounting the media asset on a cleaning machine;
   unwinding the tape from the supply reel and cleaning the tape with a cleaning machine, wherein cleaning the tape with the cleaning machine comprises positioning the tape within a receiving area defined by a first cleaning arm and a second cleaning arm of a cleaning device, guiding the tape through the receiving area such that a first side of the tape contacts a first cleaner rotatably mounted on the first cleaning arm and a second side of the tape contacts a second cleaner rotatably mounted on the second cleaning arm, and selectively rotating the cleaning device to adjust an amount of contact between the first cleaner and the tape and between the second cleaner and the tape;

wherein treating the media asset comprises:
  baking the media asset;
  determining whether adjacent layers of the tape are stuck to each other and, if so:
    submerging the tape in a cleaning bath for a predetermined period of time,
    unwinding the tape from the supply reel to a take-up reel at an unwind speed while drying the magnetic tape, and
    rewinding the tape onto the supply reel at a rewind speed; and
  re-baking the media asset.

2. The method of claim 1, wherein the unwind speed is from 0.1 meters per second (mps) to 4.0 mps, and wherein the unwind speed is from 0.1 mps to 4.0 mps.

3. The method of claim 2, wherein the unwind speed is 0.2 mps, and wherein the rewind speed is 2.0 mps.

4. The method of claim 1, wherein the predetermined period of time is at least 48 hours.

5. The method of claim 4, wherein the predetermined period of time is from 48 hours to two weeks.

6. The method of claim 1, wherein baking the media asset and re-baking the media asset each comprises heating the media asset in a temperature of from 130° F. to 140° F. for a baking time period of from one hour to ten hours.

7. The method of claim 1, wherein treating the media asset further comprises:
  removing at least one flange from the supply reel of the media asset before submerging the tape in the cleaning bath; and
  re-attaching the at least one flange to the supply reel before unwinding the magnetic tape from the supply reel.

8. The method of claim 1, wherein determining whether adjacent layers of the tape are stuck to each other comprises at least one of visual examination of the media asset and auditory examination of the media asset.

9. The method of claim 1, wherein the cleaning bath comprises distilled water.

10. The method of claim 1, further comprising:
  performing a data entry process before preliminarily cleaning the media asset by:
    receiving the media asset;
    creating a unique identification for the media asset;
    optically scanning the media asset; and
    removing the media asset from a media asset container; and
  performing an asset recapture process after re-baking the media asset by storing the media asset in a media asset container.

11. The method of claim 1, wherein the tape comprises a first side edge adjacent to a first flange of the supply reel and a second side edge adjacent to a second flange of the supply reel, and wherein preliminarily cleaning the media asset comprises:
  removing the first flange from the supply reel to expose the first side edge of the tape;
  removing loose particles of excess contamination from the first side edge of the supply reel;
  removing contamination stains from the first side edge of the supply reel by wiping the first side edge with a tape-cleaning solution;
  cleaning the first flange with a flange-cleaning solution; and
  re-attaching the first flange to the supply reel.

12. The method of claim 11, wherein the tape-cleaning solution comprises hydrogen peroxide, and wherein the flange-cleaning solution comprises bleach.

13. The method of claim 11, further comprising:
  removing the second flange from the supply reel to expose the second side edge of the tape;
  removing loose particles of excess contamination from the second side edge of the supply reel;
  removing contamination stains from the second side edge of the supply reel by wiping the second edge with the tape-cleaning solution;
  cleaning the second flange with the flange-cleaning solution; and
  re-attaching the second flange to the supply reel.

14. The method of claim 1, wherein treating the media asset further comprises:
  re-determining whether adjacent layers of the tape are stuck to each other and, if adjacent layers of the tape are stuck to each other, re-submerging the tape in the cleaning bath for another predetermined period of time.

15. The method of claim 1, wherein finally cleaning the media asset further comprises:
  cleaning flanges of the media asset; and
  rewinding the tape onto the supply reel and cleaning the tape.

16. The method of claim 1, wherein rewinding the tape onto the supply reel at a rewind speed further comprises drying the tape.

* * * * *